(12) United States Patent
Shacham et al.

(10) Patent No.: US 8,892,726 B2
(45) Date of Patent: Nov. 18, 2014

(54) APPARATUS AND METHOD FOR TRACKING REQUESTS IN A MULTI THREADED MULTI TIER COMPUTERIZED ENVIRONMENT

(75) Inventors: Lanir Naftaly Shacham, Ramat Hasharon (IL); Oren Shlomo Elias, Herzeliya (IL); Jacob Ukelson, Tel Aviv (IL); Sam Somech, Ramat Gan (IL); Anton Bolotinsky, Ramat Gan (IL)

(73) Assignee: Correlsense Ltd., Hertzlia (IL)

( * ) Notice: Subject to any disclaimer, the term of this patent is extended or adjusted under 35 U.S.C. 154(b) by 244 days.

(21) Appl. No.: 12/934,657

(22) PCT Filed: Mar. 30, 2008

(86) PCT No.: PCT/IL2008/000439
§ 371 (c)(1),
(2), (4) Date: Oct. 21, 2010

(87) PCT Pub. No.: WO2009/122390
PCT Pub. Date: Oct. 8, 2009

(65) Prior Publication Data
US 2011/0035493 A1    Feb. 10, 2011

(51) Int. Cl.
*G06F 15/173* (2006.01)
*G06F 9/54* (2006.01)
*H04L 29/08* (2006.01)
*H04L 29/06* (2006.01)

(52) U.S. Cl.
CPC .............. *G06F 9/544* (2013.01); *G06F 9/545* (2013.01); *H04L 67/02* (2013.01); *H04L 67/10* (2013.01); *H04L 69/22* (2013.01)
USPC ........................................................ 709/224

(58) Field of Classification Search
None
See application file for complete search history.

(56) References Cited

U.S. PATENT DOCUMENTS

| 5,790,789 | A  | * | 8/1998  | Suarez ........................... 709/202 |
| 6,108,700 | A  |   | 8/2000  | Maccabee et al. |
| 6,356,555 | B1 |   | 3/2002  | Rakib et al. |
| 6,714,962 | B1 | * | 3/2004  | Helland et al. ................. 709/203 |
| 6,823,382 | B2 | * | 11/2004 | Stone ............................ 709/224 |
| 7,076,784 | B1 | * | 7/2006  | Russell et al. ................. 719/315 |
| 2002/0198734 | A1 |   | 12/2002 | Greene et al. |
| 2003/0014464 | A1 |   | 1/2003  | Deverill et al. |
| 2003/0212654 | A1 | * | 11/2003 | Harper et al. ...................... 707/1 |
| 2004/0177042 | A1 | * | 9/2004  | Fostick ............................ 705/51 |
| 2006/0015512 | A1 | * | 1/2006  | Alon et al. ..................... 707/100 |
| 2007/0160198 | A1 |   | 7/2007  | Orsini et al. |
| 2007/0276786 | A1 | * | 11/2007 | Piedmonte ......................... 707/2 |
| 2007/0282988 | A1 | * | 12/2007 | Bornhoevd et al. ............ 709/223 |
| 2010/0132024 | A1 | * | 5/2010  | Ben-Natan et al. ................ 726/9 |

* cited by examiner

*Primary Examiner* — Mohamed Wasel
*Assistant Examiner* — Tsung Wu
(74) *Attorney, Agent, or Firm* — Soroker-Agmon (57) ABSTRACT

The subject matter discloses a method and apparatus for associating requests and responses in a multi-tier computerized environment, comprising for each tier, detecting incoming and outgoing data flow; sending the detected data to a processing module; for each two neighboring tiers, comparing incoming data of one tier and outgoing data of the other tier; associating incoming requests of one tier to outgoing requests of the other tier. The association may use an ad-hoc ID. The subject matter also discloses a computerized apparatus detecting data and sending the data to a central storage outside the multi-tier environment when the data is used to match requests and responses.

Another object of the subject matter is a method for associating an incoming request and outgoing response or outgoing requests in a multi-threaded computerized environment.

17 Claims, 5 Drawing Sheets

APPARATUS AND METHOD FOR TRACKING REQUESTS IN A MULTI THREADED MULTI TIER COMPUTERIZED ENVIRONMENT

RELATED APPLICATIONS

This application is related to PCT application number PCT/IL2007/001062, titled apparatus and method for tracking transaction related data.

BACKGROUND OF THE INVENTION

1. Field of the Invention

The present invention relates to tracking transaction related data within a computerized device in general, and to tracking transaction related data in a multi-tier computerized environment, in particular.

2. Discussion of the Related Art

A complex, multi-tier computerized network environment makes it difficult to keep track of a single transaction as it spans across multiple tiers. A tier can be a software or hardware module that executes an application. An example for such multi-tier computerized environment can comprise a HTTP tier, such as a web portal, and servers, databases; packaged and homegrown applications.

A transaction sent by a user preferably requires resources of several tiers, and in many cases generates several requests. Such requests are sent to tiers for retrieving or modifying data stored in such tiers. For example, retrieving data according to a query sent from a user, or updating data in case a user performs an action via the multi-tier computerize environment.

One solution for tracking requests and responses of a single transaction is to add a tag to a parent request, the first request of a transaction, and maintain the same tag for other requests generated by the parent request. This solution requires a tagging module that is complex to implement, install and can be perceived as intrusive therefore raise concern with users and system administrators. More so, it may influence the entire tier or client machine in case of a malfunction. Further, the tag is added to the packet headers related to requests and responses and thus handles deeper layers of the operating system, network or communication protocol.

Figure 1A:
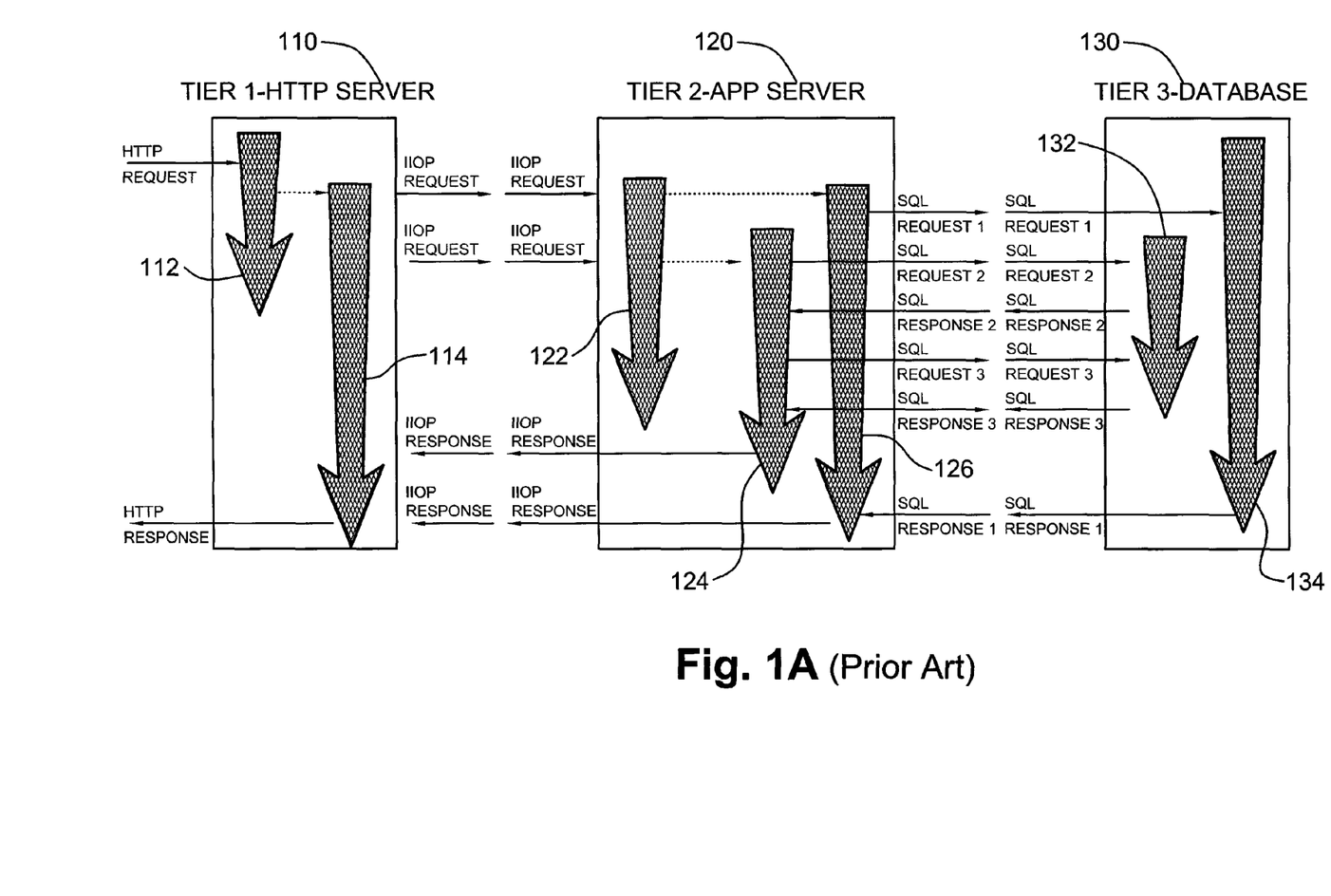
FIG. 1A shows a multi-tier computerized environment, according to some embodiments of the prior art.

In accordance with some known architectures, two or more threads may operate within a single tier. For example, a listener-worker model, in which one thread receives a request and delegates the request to another thread that executes it, generates additional requests or sends the request to another tier. Other architectures may comprise additional threads, for example, another thread that receives responses from other tiers and sends a response to the tier from which the request was sent. FIG. 1A shows three tiers as implemented as known in the art, Tier1 (110), Tier2 (120) and Tier3 (130). A communication channel (not shown) connects Tier1 (110) and Tier2 (120) and two communication channels (not shown) connect Tier2 (120) and Tier3 (130). In case two IIOP requests are received by Tier2 (120) that generates three SQL requests sent to Tier3 (130), it is unobvious to determine which IIOP request generated the second SQL request. Associating requests generated during the handle of other requests to the request that generated them without tagging data fields in packets related to the requests and responses is hence a long felt need. Other technical problems addressed are methods for determining resource consumption of requests and the time spent by each tier or thread on each request.

U.S. Pat. No. 7,051,339 provides for track and measurement of tasks related to a transaction by tagging each data related to transactions, such as requests and responses. The disadvantages of tagging are disclosed above. U.S. Pat. No. 6,714,976 discloses tracking transactions in a client-server environment. For example, detecting data in the client side, and compare the detected data to data in the server side. The solution disclosed in U.S. Pat. No. 6,714,976 might not be suitable for a multi-tier computerized environment. U.S. patent publication number 2006/015512 discloses tracking data in a multi-tier computing environment by assigning two agents on each tier, one agent for detecting data related to requests and another agent communicates with agents of neighboring tiers and send the data fields detected by the first agent. This solution requires another communication channel for the transmission of data related to request and requires another module for each tier. Additionally, the solution requires two agents in each tier, for different purposes, one for detecting and the other for processing data and transmits it to agent of other tiers.

It is desirable to provide a method and apparatus for associating several requests to the same transaction without the need to add or modify modules within the kernel, therefore to operate seamlessly within the user space, hence remove to the need for a kernel space agent. Further, it is desirable to associate requests and responses using only one agent in each tier, and to associate requests in a multi-threaded environment. Another technological problem is to associate requests without modifying request data or response data; whether in the packet level or the byte stream level, and without adding additional communication interactions is between the tiers by using more agents.

SUMMARY OF THE PRESENT INVENTION

The disclosed subject matter provides for methods and apparatus for associating requests and responses without using another module in the tiers besides the parsing modules or another detecting element. The subject matter also discloses a method for associating requests and responses in case more than one thread operates in the tiers.

It is one object of the subject matter to disclose a method of associating requests and responses in a multi-tier computerized environment, comprising for each tier, detecting incoming and outgoing data flow; sending the detected data to a processing module; for each two neighboring tiers, comparing incoming data of one tier and outgoing data of the other tier, and associating incoming requests of one tier to outgoing requests of the other tier.

In some embodiments, the method further comprises a step of determining resource consumption of a request. In some embodiments, the method further comprises a step of determining resource consumption of a transaction. In some embodiments, an agent residing within the tier performs detecting incoming and outgoing data flow. In some embodiments, an agent residing outside the tier performs associating incoming requests of one tier to outgoing requests of a neighboring tier.

It is another object of the subject matter to disclose an apparatus for associating requests and responses in a multi-tier computerized environment, comprising at least one parsing unit, for parsing incoming and outgoing data flow between tiers; a central storage for receiving and storing the incoming and outgoing data flow parsed by the at least one parsing unit; a processing unit for associating outgoing data from one tier and incoming data of another tier.

In some embodiments, the at least one parsing unit resides within each tier. In some embodiments, the processing module is connected to the at least one parsing units. In some embodiments, the processing module resides outside the tiers.

It is another object of the subject matter to disclose a method of associating an incoming request and outgoing response in a multi-threaded computerized environment comprises: detecting the incoming request; after executed by a working thread, detecting the outgoing response transmitted to a sending tier from which the request was sent to an executing tier; associating the incoming request and the outgoing response according to the communication channel using which the response was transmitted.

In some embodiments, the method further comprises a step of detecting data associated with outgoing child requests generated by the working thread executing the request and detecting incoming responses to the child requests. In some embodiments, the association is performed using an ad-hoc ID contained within the outgoing response and a value contained within the sending tier that receives the outgoing response. In some embodiments, the value is a serial number of an event performed after the step of establishing the communication channel. In some embodiments, the value is a serial number of a countable event executed within the tier. In some embodiments, the value is a function of a hash code or a CRC process.

It is another object of the subject matter to disclose a method for associating an incoming request and outgoing request of a request executed in a multi-threaded tier, comprising: detecting the incoming request; detecting incoming data flow related to the communication channel via which the incoming request was transmitted to the tier; detecting the outgoing request; detecting the thread that handles the outgoing request; detecting outgoing data flow related to the communication channel via which the outgoing request was transmitted from the tier; comparing data fields detected in both the incoming request and the outgoing request.

In some embodiments, the method further comprises a step of associating between the incoming request and the outgoing request according to the detected data. In some embodiments, the method further comprises steps of detecting an incoming response, detecting the communication channel via which the incoming response was transmitted to the tier and detecting the thread that sent the incoming response. In some embodiments, the method further comprises a step of detecting an outgoing response and the thread ID of the thread that handled the outgoing response.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION OF THE PREFERRED EMBODIMENT

One technical problem addressed by the disclosed subject matter is to track requests associated with a transaction without modifying or adding data fields within the request. Another technical problem is to associate requests and responses within a multi-threaded tier.

The technical solution disclosed in the subject matter comprises an apparatus and method for associating requests related to the same transaction and handled in a multi-tier computerized environment. A transaction is preferably a command or request for receiving or modifying data within a data field located in a computerized environment. For example, a transaction may refer to receiving data associated with bank account details, or transferring money between accounts, purchase of stocks and the like. In accordance with an exemplary embodiment of the subject matter, the apparatus comprises at least one parsing unit residing in at least a portion of the tiers in the multi-tier computerized environment or in communication with one or more tiers. In an alternative embodiment, at least one parsing unit may detect data flow related to more than one tier. Such at least one parsing unit detects incoming and outgoing data flow of one or more tiers. The at least one parsing unit is connected to a processing module that associates requests and responses related to the same transaction, based on data sent from the at least one parsing unit. Since each parsing unit is aware of partial information regarding requests and responses, the processing module associates the requests and responses according to predetermined algorithms and data fields. In an exemplary embodiment of the subject matter, the data detected by the at least one parsing unit is sent to a central storage, connected to the processing module that uses the data within central storage to associate requests and responses. The association further results in determining resource consumption of transactions, and the time required for each request relate to the transaction.

The disclosed subject matter also provides for associating incoming requests and outgoing requests of the same tier in a multi-threaded environment, in which more than one thread handle the request. Such method is disclosed in details below.

Figure 1B:
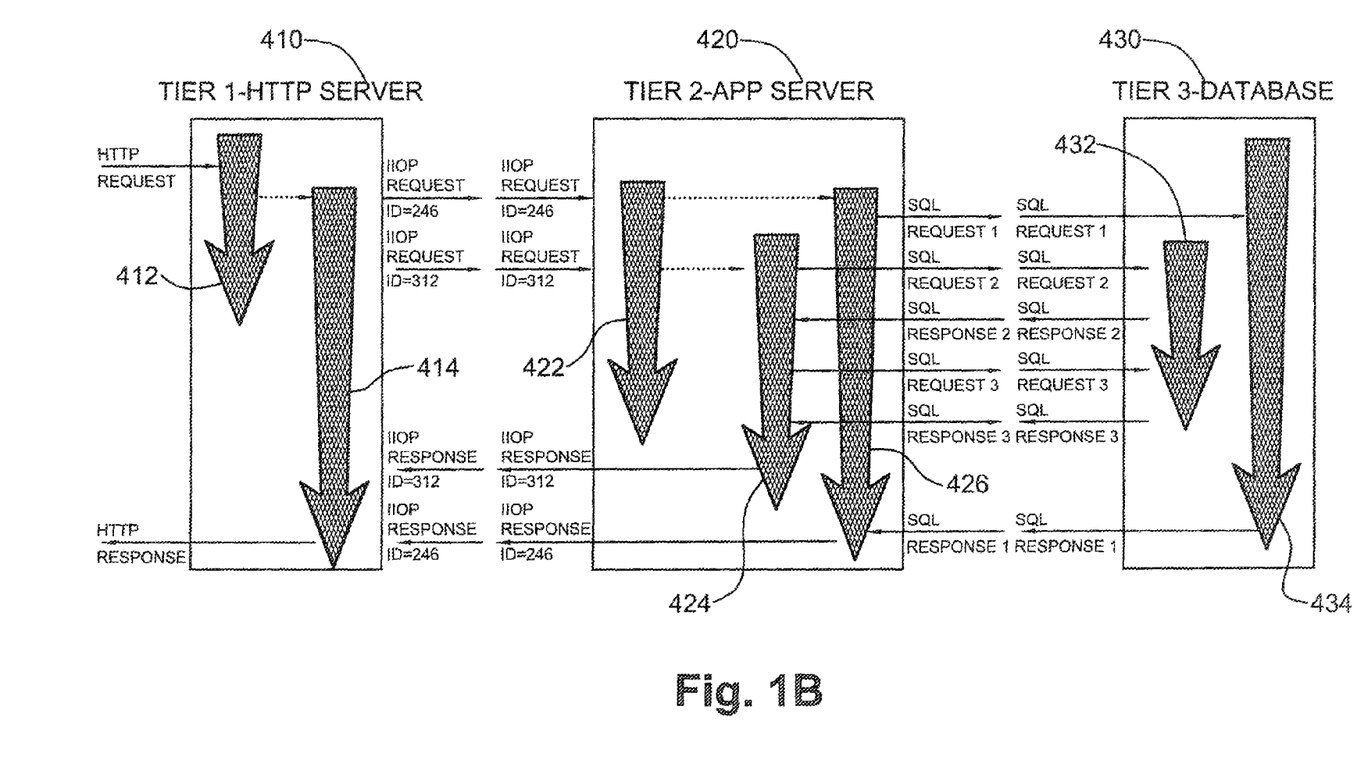
FIG. 1B shows a multi-tier computerized environment, according to in some embodiments of the disclosed subject matter.

FIG. 1B shows a multi-tier computerized environment, according to some embodiments of the disclosed subject matter. According to the disclosed example, Tier1 (410) is an HTTP server that receives HTTP requests from a user or from another tier (not shown). Tier2 (420) is an application server that receives requests from Tier1 (410) and sends responses to Tier1 (410) after the request is processed. Tier3 (430) is a database server that receives requests from Tier2 (420) and sends responses to Tier2 (420) after the requests are processed. A multi-threaded tier comprises several threads, each performs a different task in handling the request.

For example, Tier 1 (110) comprises two threads, a listener thread 412 and a worker thread 414. Listener thread 412 receives a request from a neighboring tier and delegates the request to the worker thread 414 within the tier. Worker thread 414 handles the request received from listener thread 112 and may generate additional requests that may be sent to Tier2 (420). In some exemplary configurations of a multi-threaded tier, worker thread 114 also receives HOP responses from Tier2 (420) and may send the HTTP response back to Tier1

(410) to the user (not shown). Worker thread 414 may execute the request in the tier, or generate additional requests associated with the incoming request. Such additional requests are also named child requests.

Tier2 (420) comprises three threads, receives requests from Tier1 (410) sends responses to Tier1 (410), sends requests to Tier3 (430) and receives responses from Tier3 (430). The three threads are listener thread 422, worker thread 424 and worker thread 426. Listener thread 422 of Tier2 (420) receives the request from Tier1 (410), sends the request within Tier2 (420) to worker thread 424 that handles the request, and preferably sends additional requests to Tier3 (430). Worker thread 424 may also generate SQL Request 2, receive response SQL Response 2, generate SQL Request3, receive SQL Response 3 and send the response HOP Respond312 to Tier 1(400). Worker thread 426 receives HOP request 246 from listener thread 422, generates SQL Request 1, receives SQL respond 1, and send response IIOP Response246 to Tier1 (410). The multi-thread architecture requires less operations from each thread and enables more requests to be handled at a given time period. The communication between Tier1 (410) and Tier2 (420) is performed via a communication channel, while the communication between Tier2 (420) and Tier3 (430) is performed via two communication channels (not shown). As a result, when SQL Request2 is sent from Tier2 (420) to Tier3 (430) via communication channel 2, one cannot detect whether SQL Request2 was generated by IIOP Request 246 or IIOP Request 312, sent from Tier 1 (410) to Tier2 (420). The technical problem is to determine the parent request of a request in a multi-threaded environment without tagging requests and without interfering in the kernel level, especially when the communication protocols implement asynchronous responses. The communication channel may be any computerized entity in which one side is enabled to write data and other side is enabled to read data. Such computerized entity may be a TCP/IP socket, a pipe, shared memory, a file, a queue, a messaging queue and the like.

According to some exemplary embodiments of the disclosed subject matter, the method comprises a step of detecting data sent to and from each of the tiers. Each detected request or response is stored, partially or in its entirety in storage associated with a tier or associated with a communication channel. In an exemplary embodiment of the subject matter, each detected request or response is assigned one or more values or parameters by the at least one parsing unit. For example, the value may be a time stamp related to the time a request or response was sent or received, a serial number or index related to the number of requests or responses sent after a specific event, such as a protocol handshake, a communication channel ID or thread ID that handled or generated the request or response and the like. The value or index of the request or response is stored in the storage. The storage may reside within the tier, or can be connected to the at least one parsing unit. Another parameter that may be stored by the storage is an ad-hoc ID of each request. Such ad-hoc ID is generated by the thread handling the request, preferably when using asynchronous protocols, and is stored in the response to each request. Such ad-hoc ID is not generated by the application disclosed in the subject matter, and is not implemented the same way as the tagging method disclosed in the prior art. According to the disclosed subject matter, the ad-hoc ID is not provided in the context of previous requests or responses, but only in the context of the handled request or response, and is stored in the storage and used for further associating requests and child requests. When a request is sent from Tier1 (410) to Tier2 (420), both storages of Tier1 (410) and Tier2 (420) detect the ad-hoc ID of the request. In an alternative exemplary embodiment of the subject matter, an agent residing in the tier may determine or assign the ad-hoc ID to the request or response. Once a response is sent from tier2 (420) to Tier1 (410), it is logged in both storages of Tier1 (410) and Tier2 (420). As a result, the time elapsed between the request was sent from Tier1 (410) and the associated response was sent from tier2 (420) can be determined as a function of the time measured by both Tier1 (410) and Tier2 (420).

The data stored in the storages of Tier1 (410) and Tier2 (420) is sent to a central storage where the requests are associated by the ad-hoc ID, the tiers' ID, timestamps, communication channels ID and the like. Hence, one can determine the requests related to a specific transaction and the resource consumption of the different requests. Resource consumption of requests can be measured from the initiation of a request, until the specific tier receives a response or sends back a response. The measurement of resource consumption may be achieved by inquiring the operating system using common APIs detecting the thread's current resource consumption profile, such as for example CPU consumption during a time period, number of bytes read/written to I/O devices, consumption of RAM memory, how much bytes were read/written to the network and the like. Another parameters logged in the storages that facilitates determining resource consumption is the timestamp of which a request is sent and the response is received, which allows measuring the time spent in each tier and between tiers in the communication channel. In some exemplary embodiments of the disclosed subject matter, the accuracy of time detected in more than one tier is limited to the differences between the clocks in the more than one tier. In other embodiments, the methods further comprise a step of synchronizing the clocks of the more than one tier.

Figure 2:
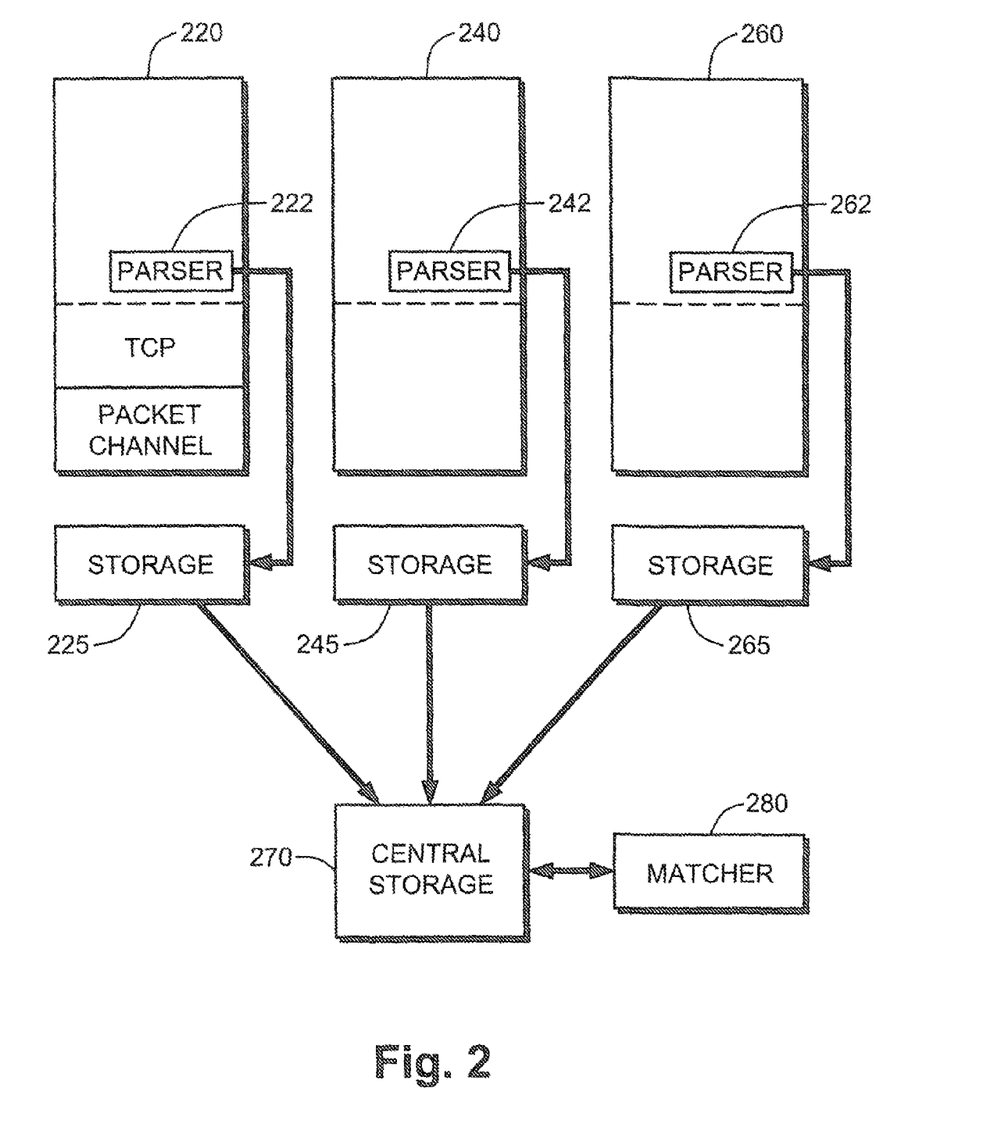
FIG. 2 shows a computerized environment according to some exemplary embodiments of the subject matter.

FIG. 2 shows a computerized environment according to some exemplary s embodiments of the subject matter. The computerized environment comprises three tiers, 220, 240 and 260. According to the example of FIG. 2, when a transaction is sent to the computerized environment, it is received at tier 220. When a request is received at tier 220, the request is logged by parser 222 with parameters associated with the request. Such parameters may be the time the request was sent or received, ad-hoc ID of the request, a hash-code value of the request characters, a hash-code value of the request parameters or combination, a result of a CRC function applied over the request characters or the request parameters or combination. Other parameters may be parts of the protocol which can be associated with a single request instance, a communication channel ID from which a request or response was received at a tier, a counter ID indicating the number of previous requests received or sent by tier 220, IP: port of the source or destination of the request, whether the request is incoming or outgoing and the like.

When a response is received at tier 220 or sent from the tier 220, similar parameters are detected by parser 222 and stored in storage 225. In a preferred embodiment of the disclosed subject matter, data fields within the requests are not modified when requests are transmitted between tiers. Additionally, no data fields are added to the request, as performed when using a tagging module. Parsers 222, 242 and 262 may reside in the user's space, and may reside in the kernel space, according to the preferences and specifications of the tiers and the computerized environment.

Parser 222, as well as parsers 242, 262 from tiers 240, 260 may perform several parsing methods, either complicated parsing methods or shallow parsing. Suggested parsing methods may be Top-down parsing, such as recursive descent parser, LL parser, packrat parser, or bottom-up parsing methods such as precedence parser, BC (bounded context) parsing or LR parser and the like. Storages 225, 245 and 265 may be any kind of memory, such as RAM, ROM, flash, magnetic memory, and the like. Storages 225, 245 and 265 may reside within the tiers, or communicate with the tiers. Each storage communicates with the tiers and with central storage 270 and transmits data detected by the associated parser to the central storage 270. For example, storage 225 of tier 220 receives data from parsing unit 222 and sends the data to central storage 270. In some exemplary embodiments of the subject matter, storage 225 sends all the data fields to central storage 270. Alternatively, the data sent from the storages 225, 245 and 265 to central storage 270 is provided only upon a query from central storage 270. For example, central storage 270 requests only data related to some requests, data related only to data flow during a time period, data related only to requests associated with a specific entity or the like.

In some exemplary embodiments of the disclosed subject matter, central storage 270 and a processing module (not shown) reside in a server-like module of the computerized environment, while the tiers and the storages associated with the tiers reside at a client-like module of the computerized environment. As such, the server side is connected to many client sides, each resides in each tier. In a preferred embodiment of the subject matter, processing module (not shown) comprises matching unit 280. According to some exemplary embodiments of the disclosed subject matter, matching unit 280 associates outgoing requests from tier N and the incoming requests to tier N+1, for example, outgoing requests from tier 220 and incoming requests to tier 240. According to one exemplary embodiment of the subject matter, implementation of matching between data received from several tiers is performed by storing the requests and responses related to each tier in a separate sequence, and assign a unique value to each request or response. Such unique values may be based on a time stamp, IP:port, counter ID, communication channel ID, request ID, ad-hoc ID, message queue ID, file ID, file type ID, correlation ID, result of a hash code function, CRC function result and the like. An example of a sequence may be incoming requests to tier N+1, while another sequence may contain outgoing responses from tier N+1, compared to a sequence containing incoming responses to tier N. As noted above, variety of parameters may be used in associating elements within the sequences, as listed above.

Matching unit 280 allows association of several requests to one another or to a transaction using the data detected by parsing units as disclosed above while avoiding the tagging module as disclosed in the prior art. Matching unit 280 associates outgoing requests from tier N and incoming requests to tier N+1. The association is performed by comparing parameters related to data fields of the requests or to packets that contain the requests. Such parameters may be time stamp, IP:port, counter ID, communication channel ID, request ID, ad-hoc ID, message queue ID, file ID, file type ID, correlation ID, result of a hash code function, CRC function result and the like. Association of a request received at tier N and requests generated as a result of handling the previously received request requires monitoring of thread activity, communication channels used, the way a request is handled by a thread and the like. In some exemplary embodiments of the disclosed subject matter, a thread-to-thread table is utilized to correlate the data based on the communication channel being used, the ad-hoc ID if exists and the like.

According to computerized environments disclosed in the prior art, an agent residing within the tier adds or modifies data fields of the request, and determines the relations between requests and the child requests. Such agent is complex to provide in the client side within the tiers, and is more difficult to install, maintain, and is perceived as more intrusive, and may affect the entire tier or client machine in case of a malfunction. According to one exemplary embodiment of the disclosed subject matter, the processing of data fields associated with requests and responses sent from storages 225, 245, 265 is only performed in matching unit 280. In an alternative embodiment of the disclosed subject matter, the data is sent from the tiers to matching unit 280 that stores the received data in central storage 270 and retrieves such data when required to associate requests.

According to some exemplary embodiments of the subject matter, matching unit 280 matches incoming request of tier N+1 and outgoing requests of tier N using parameters stored in storages 225, 245, 265 such as the timestamp of each request, ad-hoc ID, the unique ID of the request as determined using hash functions or CRC functions and alike and the like. Such data is received from both tier N and tier N+1, and matched by matching unit 280. Matching unit 280 compares data stored in storage associated with tier. N with data stored in storage to associated with tier N+1 and matches incoming requests of tier N+1 and outgoing requests of tier N as noted above. In case one of the storages has more indexes, for example in case a request was not received at tier N+1, or a request received more than once, or values of parameters of the request that are used within the sequence are identical for different requests, several algorithms may be used by matching unit 280. This problem is also named sequence alignment episode matching problem, and may be solved using any method known to a person skilled in the art. One solution may be synchronizing the sequences using a Longest Common Subsequence (LCS) algorithm. Another solution may be LCS-Delta algorithm.

Figure 3A:
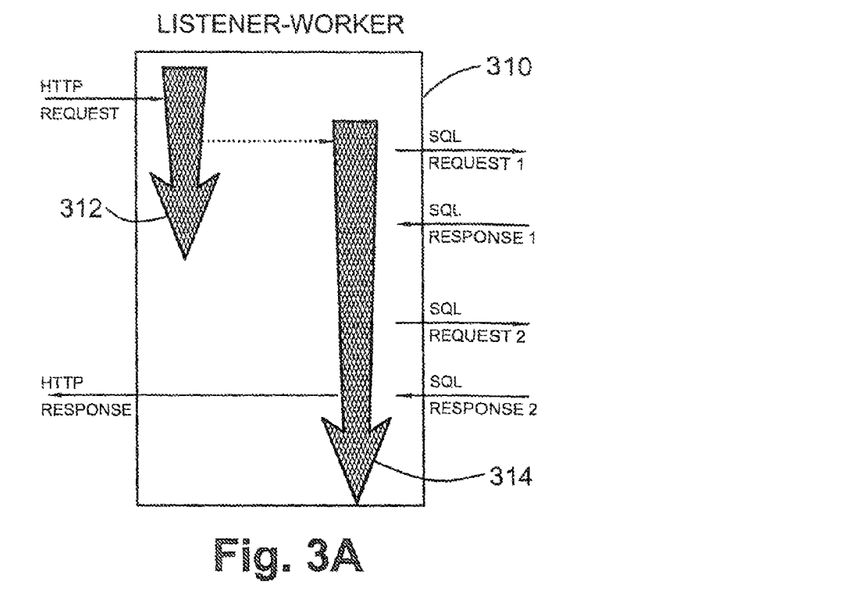
FIGS. 3A and 3B show multi-threaded tiers within a multi-tier computerized environment, according to some exemplary embodiments of the disclosed subject matter; and, FIG. 4 shows a flowchart of the method for associating requests within a multi-tier computerized environment, according to some exemplary embodiments of the subject matter.
Figure 3B:
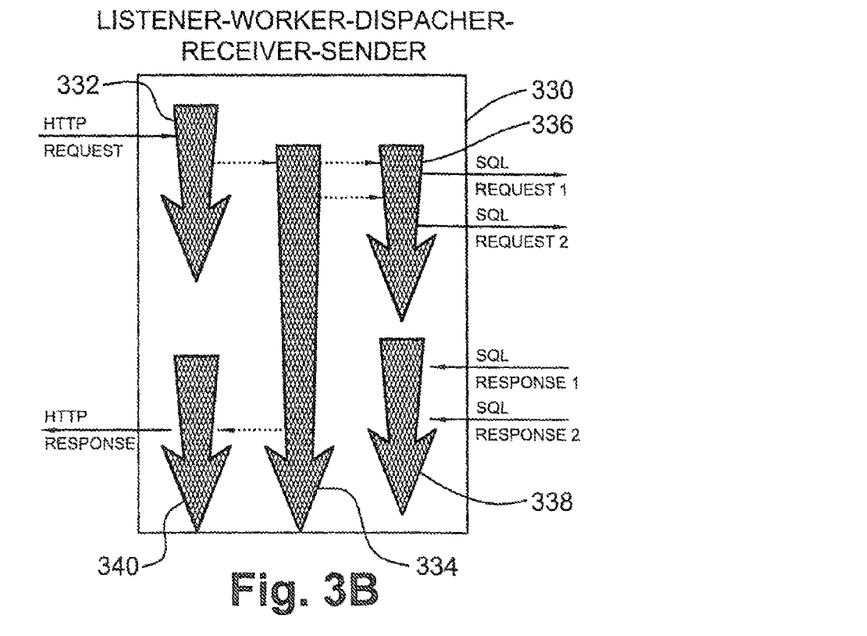

FIGS. 3A and 3B show multi-threaded tiers within a multi-tier computerized environment, according to some exemplary embodiments of the disclosed subject matter. FIG. 3A shows a tier 310 comprising two threads, a listener thread 312 and a worker thread 314. According to some exemplary embodiments of the disclosed subject matter, an incoming request arrives to the listener thread 312 over an existing communication channel. The ID of listener thread 312 and the communication channel ID the request was sent upon are both logged to the storage within the tier or associated with the tier, such as storages 225, 245, 265. The arriving request is assigned an ID by the parsing unit within the tier where the thread executes. Such ID is different from the ad-hoc ID since it is assigned and determined by an agent of the disclosed subject matter, not by the protocol implementation within the monitored application as the ad-hoc ID. This request is then sent to a working thread 314.

If a response is returned immediately, then the association between the request and the respond is done according to the communication channel, s assuming a synchronous protocol. In an asynchronous protocol, the association between the request and the respond is done according to the ad-hoc ID generated by the protocol implementation.

In case the working thread generates additional requests, they are logged to the storage. Outgoing requests generated by threads that handle a request are also called child requests. In case a child request is sent to another tier, a new ID is assigned to the child request, and the information regarding the working thread 314 that sent the child request and the communication channel used are logged to the storage associated with the tier. In an exemplary embodiment of the subject matter, the parser (such as 222, 242 and 262 of FIG. 2) assigns the new ID to the child request. After a response is returned to the working thread 314, the working thread 314 sends the response to the request that arrived to the listener thread 312. This response is sent over the same communication channel that the request arrived on, thus enabling association of the request arriving to the listener thread 312, the child requests sent by the worker thread 314, and their responses with the response sent back by the working thread 314 over the same communication channel. When a synchronous protocol is used, the response is sent immediately after the request. When an asynchronous protocol is used, the association between the request and response is done according to the ad-hoc ID generated by the protocol implementation. Thus, an association between the arriving request and the new generated child requests is created. In case more than one request is received at a specific tier using an asynchronous protocol, the response to each request carries an ad-hoc ID, in order to identify a specific request relative to the others. Such ad-hoc ID is matched with a value associated with a specific incoming request. For example, in case three requests are generated and sent from one tier to another after the communication is established, each request is assigned a value. Such value may be a function of the ad-hoc ID, or may be associated with the respective ad-hoc ID using an adaptive storage. For example, a numeric value is assigned to a request, indicating the number of events that happened before the request was sent from a tier. The ad-hoc ID of the response to that specific request carries an ad-hoc ID associated with the numeric values of the request. In case the communication protocol is synchronous, the association is simple since each response corresponds to the previous request. In most cases, a response is sent on the same communication channel used to transmit the request associated with the response. Hence, the association may be provided by parsing data associated with to the requests and responses and parsing data flow on a specific communication channel.

FIG. 3B shows another embodiment of a multi-threaded tier 330. Tier 330 comprises listener thread 332 that receives the request and sends the request to working thread 334. In case additional child requests are generated by working thread 334, they are sent by worker thread 334 to a dispatcher thread 336 that sends the actual child requests to the neighboring tier. Once a child request is sent, a new ID is assigned to the child request, and the information regarding the communication channel it was sent over is logged to the storage associated with the tier. A receiver thread 338 receives the response from the next tier. The respond is sent over the same communication channel, and can be associated with the request according to the order, if a synchronous protocol is used, or according to the ad-hoc ID if an asynchronous protocol is used. Next, the response is delegated back to the worker thread 334. Worker thread 334 sends the response to a sending thread 340 that sends the response to the tier that generated the request associated with the response. In accordance with the multi-threaded architecture disclosed above, a thread-to-thread table is required to associate requests with their child requests. Such thread-to-thread table maps the data received and sent from each thread. Mapping is performed by tracking thread actions and hooking data within the user space or kernel space. For example, detecting and parsing packets used to transmit data between tiers, or parsing byte stream transmitted via threads within the same tier.

Figure 4:
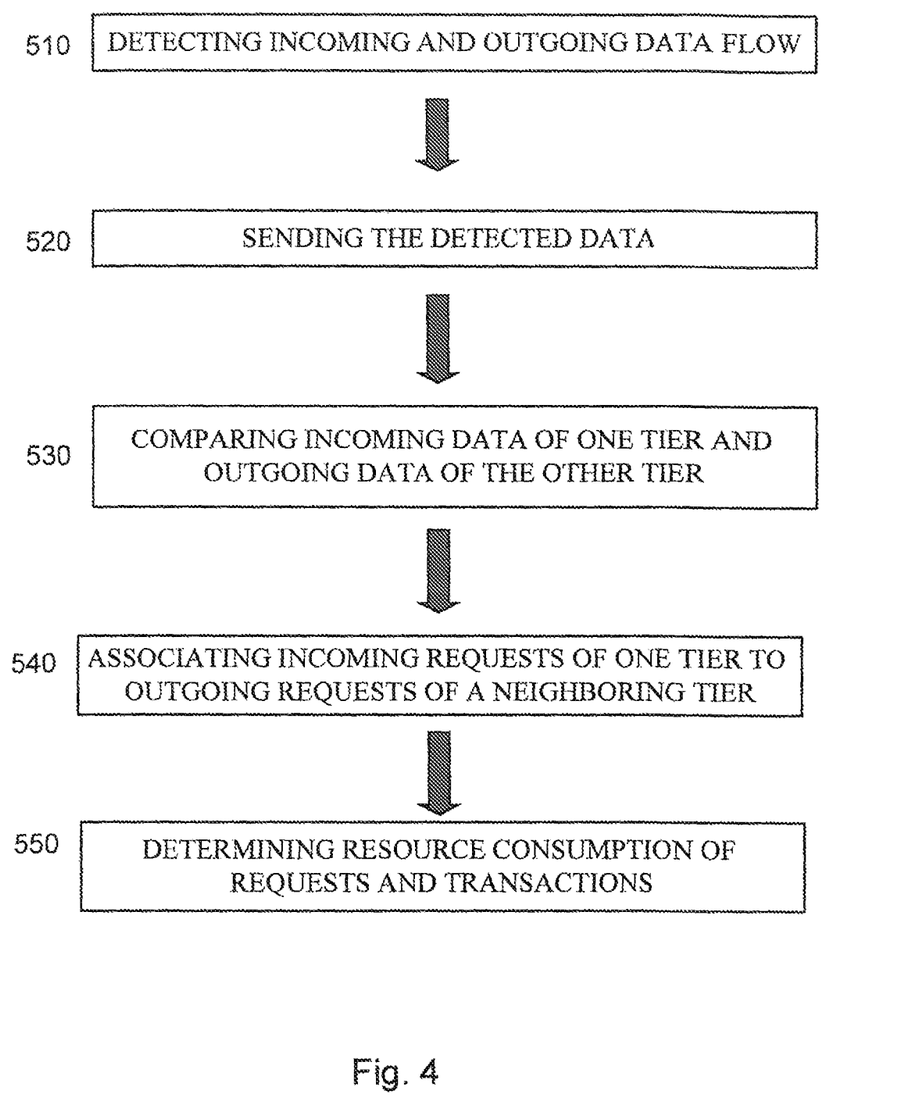

FIG. 4 shows a flowchart of the method for associating requests within a multi-tier computerized environment, according to some exemplary embodiments s of the subject matter. On step 510, data flow within tiers is detected. The detected data comprises both incoming and outgoing data flow. In accordance with an exemplary embodiment of the subject matter, the detection is performed by a parsing unit residing within the tier. In an alternative embodiment, the parsing unit is associated with one or more communication channels instead of associated with one or more tiers. On step 520, the detected data is sent from the at least one parsing unit to a processing module that analyzes the detected data. According to an exemplary embodiment of the subject matter, the processing module resides outside the tiers and communicates with the at least one parsing unit that reside within the tiers. On step 530, data detected from parsing unit of one tier is compared to data detected from parsing unit of another tier. In Accordance with exemplary embodiments of the subject matter, the comparison is performed between outgoing data flow of one tier and incoming data flow of its neighboring tier. For example, outgoing data flow of Tier1 (410 of FIG. 1B) is compared to incoming data flow of Tier 2 (420 of FIG. 1B). The comparison may be based on request ID determined by applying a hash function, CRC function or the like over the request characters or the request parameters or combination; or over other parts of the protocol which can be associated with a single request instance. Other parameters used for comparing incoming and outgoing data flow may be a communication channel ID from which a request or response was received at a tier, a counter ID indicating the number of previous requests received or sent by tier 220, IP: port of the source or destination of the request, whether the request is incoming or outgoing, the time it was sent or received by each tier and the like. The comparison may be based on other parameters as disclosed above, or as may be determined by a person skilled in the art. On step 540, requests are associated using the matching unit (280, of FIG. 2) according to the parameters disclosed above. In case there are more outgoing requests from tier N than incoming requests to tier N+1, or more incoming requests than outgoing requests, or in case similar values are associated to different requests or to more than one request, several algorithms may be implemented by the processing module, such as LCS, or any other method used by a person skilled in the art. On step 550, the processing module determines resource consumption of requests or transactions. One technical effect of the subject matter is to provide association of incoming requests of one tier and outgoing requests of another tier without modifying data within the requests and without adding a module besides a parsing or detecting module. This architecture and apparatus is new and unobvious and provides simple implementation, install and modifications. This architecture does not allow analysis of resource consumption in real time, since only the matching unit 280 is aware of the requests associated with a single transaction, while in the tagging method, each tier is aware of the previous requests associated with the same transaction.

Resource consumption is determined according to the time each request was executed within each tier, and according to the parameters related to the thread that executed the request. Since several requests are associated to the same transaction, a person skilled in the art can sum the resources consumed by each. request to determine the resource consumption of a transaction. Other resources may be CPU, memory, I/O devices, and the like, are parsed by the at least one parsing unit and sent to the central storage where the data is processed.

Time differences between tiers due to internal clock shifts is addressed by receiving periodically actual clock value of each tier and comparing to the clock value in the central storage, thus synchronizing time differences among tiers. Any other method for synchronizing tiers may be provided by a person skilled in the art.

The methods and apparatus disclosed in the subject matter may be implemented in various operating systems, among which are windows versions, Linux, Solaris, mainframe, AIX, HPUX, AS400, VxWorks or any other OS and derivatives of the above.

While the disclosure has been described with reference to exemplary embodiments, it will be understood by those skilled in the art that various changes may be made and equivalents may be substituted for elements thereof without departing from the scope of the invention. In addition, many modifications maybe made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method of associating incoming requests and outgoing requests in a multi-tier computerized environment, the multi-tier computerized environment comprises a first tier and a second tier, comprising:
   a. monitoring requests of the first tier, comprising:
      detecting an incoming request received via a first communication channel at the first tier, said incoming request is performed by a first thread operating in the first tier;
      detecting an outgoing request transmitted via a second communication channel from the first tier, said outgoing request transmitted from the first tier is generated by a second thread as a result of performing the incoming request at the first tier;
      detecting an incoming request received via the second communication channel at the first tier, said incoming request is accepted by the second thread in response to the outgoing request transmitted via the second communication channel;
      detecting an outgoing request transmitted via the first communication channel at the first tier, said outgoing request transmitted from the second thread in response to the incoming request received via the first communication channel;
   b. logging, in a thread-to-thread table, a communication channel ID, a thread ID and a time stamp related to the time each of the detected requests was sent or received;
   c. identifying, in the data stored in the thread-to-thread table, requests in which the first thread and second thread transmit or receive via a common communication channel based on the communication channel ID; and
   d. associating the outgoing requests of the first tier to the incoming requests of the first tier based on said identifying;
   wherein the first thread is different from the second thread;
   detecting an incoming request received via a third communication channel at the second tier;
   associating the incoming request received via a third communication channel at the second tier with the outgoing request from the first tier;
   wherein said associating is performed by generating a first ad-hoc ID for outgoing requests at the first tier and generating a second ad-hoc ID for incoming requests at the second tier, wherein the first tier generates the first ad-hoc ID independently from the second tier, said first ad-hoc ID is not transmitted to the second tier and is not part of the outgoing request when handled by the first tier, wherein the first ad-hoc ID and the second ad-hoc ID are the same.

2. The method according to claim 1, further comprising determining resource consumption of a request.

3. The method according to claim 1, wherein the detecting incoming data and detecting outgoing data is performed by a computerized agent residing within the first tier or the second tier.

4. The method according to claim 1, wherein associating the outgoing requests of the first tier to the incoming requests of the second tier is performed by a computerized agent residing outside the first tier or outside the second tier.

5. The method according to claim 1, further comprising detecting the second thread that handles the outgoing requests from the first tier.

6. The method according to claim 1, wherein said associating further comprising comparing data fields detected in both an incoming request and an outgoing request.

7. The method according to claim 1, further comprising storing the outgoing requests from the first tier in a separate sequence and storing the incoming requests of the second tier in another sequence, and assigning a unique value to each of the outgoing requests from the first tier and assigning a unique value for each of incoming requests of the second tier.

8. The method according to claim 1, wherein communication is on a synchronous channel, and wherein both the first tier and the second tier generate a unique value for each of the incoming requests and outgoing requests and associating the outgoing requests and incoming requests according to the unique value.

9. The method according to claim 8, wherein the value is selected from a group consisting of: a first serial number of an event performed after the step of establishing a communication channel, a second serial number of a countable event executed within a first tier or a second tier, and a function of a hash code or a CRC process.

10. The method according to claim 1, wherein the communication channel is an asynchronous communication channel and the first ad-hoc ID for outgoing requests is associated with a serial number.

11. The method according to claim 1, further comprises storing the ad-hoc ID of the outgoing request at a storage associated with the first tier and storing the ad-hoc ID of the incoming request at the second tier at a storage associated with the second tier and transmitting the ad-hoc ID of the outgoing request from the first tier and the ad-hoc ID of the incoming request to a matching unit for matching the outgoing request from the first tier and the incoming request of the second tier.

12. The method according to claim 1, wherein the thread-to-thread table matches between requests performed by at least two different threads, communication channels, threads and the way a request is handled by a thread.

13. The method according to claim 10, wherein the ad-hoc ID includes a serial number related to the number of requests or responses sent after a specific event.

14. An apparatus for associating incoming requests and outgoing requests in a multi-tier computerized environment, comprising:
   a parser for monitoring requests of a first tier, by:
      parsing an incoming request received via a first communication channel at the first tier, said incoming request is performed by a first thread operating in the first tier;
      parsing an outgoing request transmitted via a second communication channel from the first tier, said outgoing request transmitted from the first tier is generated by a second thread as a result of performing the incoming request at the first tier, said outgoing request is transmitted to a second tier in the multi-tier computerized environment;

parsing an incoming request received via the second communication channel at the first tier, said incoming request is accepted by the second thread in response to the outgoing request transmitted via the second communication channel;

parsing an outgoing request transmitted via the first communication channel at the first tier, said outgoing request transmitted from the second thread in response to the incoming request received via the first communication channel;

parsing an incoming request received via a third communication channel at the second tier;

a central storage for receiving and storing the incoming requests and the outgoing requests parsed by the parser;

wherein each tier in the multi-tier computerized environment comprises a thread-to-thread table for logging thread activity in the first tier, wherein the central storage is connected to the thread-to-thread table of each tier in the multi-tier computerized environment;

said thread-to-thread table stores a communication channel ID, a thread ID and a time stamp related to the time each of the detected requests were sent or received;

a processing module for obtaining data from the central storage and configured to associate an incoming request of the first tier and an outgoing request from the first tier to the second tier by associating the first thread and the second thread according to the communication channel ID stored in the thread-to-thread table, wherein the first thread is different from the second thread;

wherein the incoming request received via a third communication channel is associated at the second tier with the outgoing request from the first tier according to the communication channel ID stored in the thread-to-thread table of the second tier;

wherein a first ad-hoc ID is generated for outgoing requests at the first tier and a second ad-hoc ID is generated for incoming requests at the second tier, wherein the first tier generates the first ad-hoc ID independently from the second tier, said first ad-hoc ID is not transmitted to the second tier and is not part of the outgoing request when handled by the first tier, wherein the first ad-hoc ID and the second ad-hoc ID are the same.

15. The apparatus according to claim 14, wherein the parser is located within the first tier or within the second tier.

16. The apparatus according to claim 14, wherein the processing module is connected to the parser.

17. The apparatus according to claim 14, wherein the processing module is located outside the first tier or the second tier.

* * * * *